UNITED STATES PATENT OFFICE.

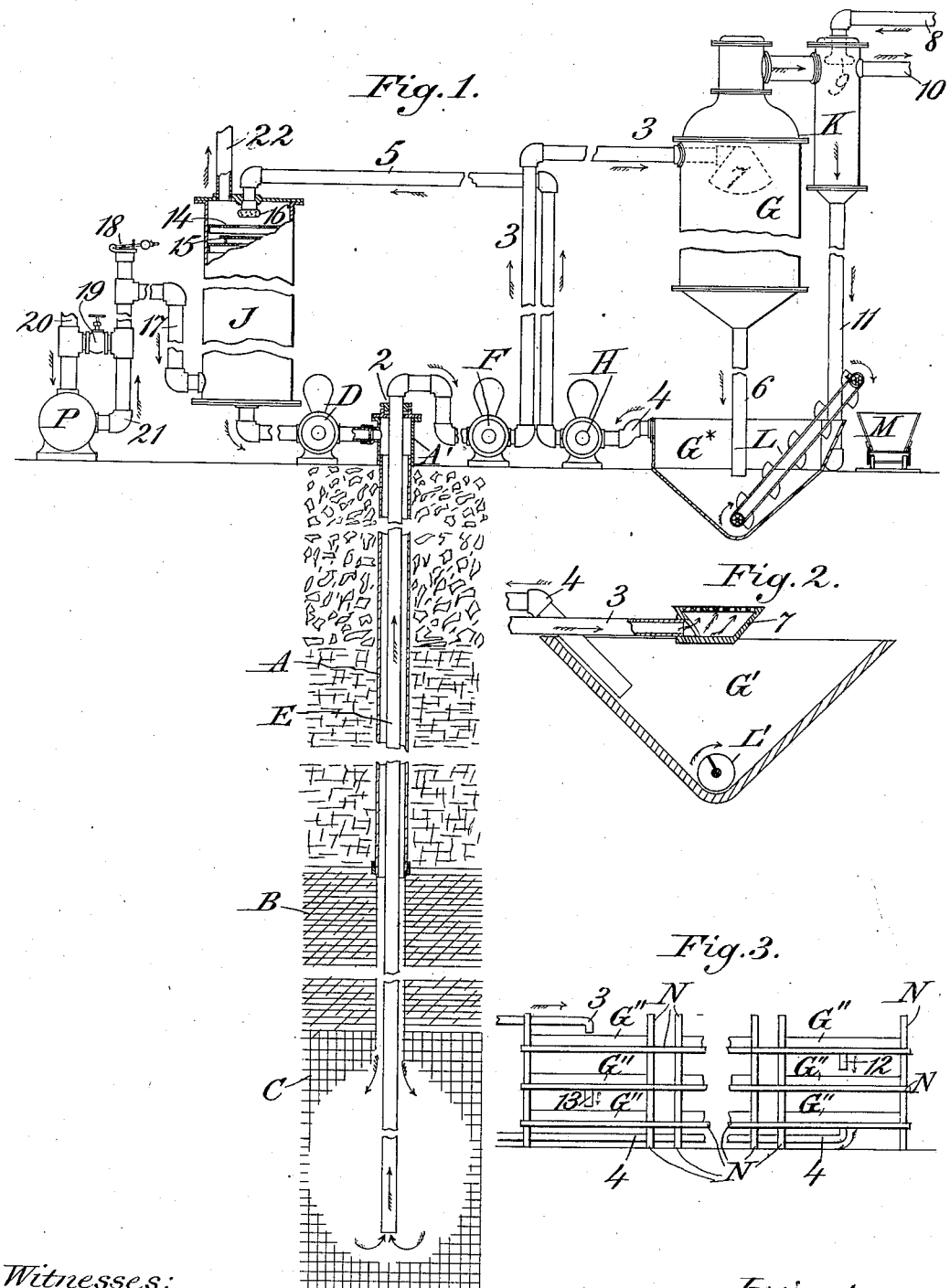

HERMAN FRASCH, OF CLEVELAND, OHIO, ASSIGNOR TO THE UNITED SALT COMPANY, OF CLEVELAND, OHIO, A CORPORATION OF OHIO.

MINING SALT.

No. 874,906.            Specification of Letters Patent.            Patented Dec. 24, 1907.

Application filed February 16, 1899. Serial No. 705,604.

*To all whom it may concern:*

Be it known that I, HERMAN FRASCH, a citizen of the United States, residing at Cleveland, in the county of Cuyahoga and State of Ohio, have invented certain new and useful Improvements in Mining Salt; and I do hereby declare the following to be a full, clear, and exact description of the invention.

This invention relates more especially to the recovery of common salt or like substance from a natural (subterranean or other) deposit, by means of a salt solution which is formed in the deposit or salt bed and is removed to the surface of the ground and from which the salt is then recovered: but each of the improvements forming part of said invention is intended to be secured for all the uses to which it may be adapted. Some of the said improvements extend to the recovery of salt or like substance from artificial deposits or masses.

Heretofore in salt-mining by water, it has been customary to introduce substantially pure water at ordinary atmospheric temperatures into the underground deposit, to allow the water to become saturated with the salt in said deposit, to remove the so-formed brine to the surface of the ground, and to evaporate it in suitable evaporators by means of close steam pipes immersed in the brine. Of course the brine from the underground deposit can be evaporated in evaporators of other known forms; but so far as I am aware, it has generally been found most advantageous heretofore to use evaporators in which the evaporation has been produced by heat imparted to the brine by means of close steam pipes.

In the case of deposits containing gypsum (hydrated calcium sulfate) along with the common salt, the brine obtained is charged with calcium sulfate; and this substance precipitates, when the brine is heated and evaporated, and thereby forms on the steam pipes (or on any other heat-transmitting walls which might be used) an incrustation which diminishes the transmission of heat through the conducting walls and makes necessary a material increase of the heating surface over what would suffice were it not for such incrustation. The incrustation also necessitates troublesome and expensive cleaning. In my experience, vacuum pans in which brine is evaporated from salt have to be cleaned twice a day by boiling the pans out with fresh water and scraping their flues. This cleaning reduces the working time and also the output of the pans, besides being expensive in itself. Open pans have their heating pipes cleaned once a week; and even with a large force of workmen much time is lost; while, besides, owing to the hardness and strong adhesion of the incrusting coat, it is necessary to knock it off with hammers, whose repeated blows shorten the life of the pipes, notwithstanding the fact that they are made extra heavy for the purpose of withstanding the hammering as long as possible. The pipes are apt to split after a certain time, when of course they will no longer retain the steam. To avoid such incrustation in mining salt from gypsum-containing salt beds is one, and a very important one, of the objects of the present invention; but this latter has advantages, irrespective of the presence of gypsum in the salt bed, and is so claimed as well as in its application to gypsum-containing salt beds or other like deposits. One advantage is that more salt can be obtained for a given amount of coal than by the old procedure as described above.

In accordance with the present invention unsaturated brine is introduced into the natural salt deposit, and allowed to dissolve the salt thereof (preferably to saturation of the brine); and the brine thus charged with more or less of the salt from said deposit, as well as with that originally in the brine, is removed from the deposit and made to give up salt by cooling and partial evaporation, the residual brine being heated and diluted for reuse in a succeeding round of operations.

This improvement can be carried out in various ways; and however it may be carried out, it has the advantage over the procedure described above as heretofore in use, that the partial evaporation and cooling, and the heating and dilution, can be readily (and indeed most advantageously) performed without requiring the transmission of heat to or from the brine through heat-conducting walls (so that there need be no such walls to become impaired by any precipitation of calcium sulfate which might take place) and also that by an appropriate adjustment of temperatures the precipitation of this substance along with the salt can be lessened (if not prevented altogether); but even if it should be preferred to transmit heat to or from the brine through heat conducting walls or to adjust the temperatures otherwise than with a view to lessening the precipitation of calcium sulfate along with the salt, nevertheless the new procedure indicated above would still be advantageous. For example, a descending column of unsaturated brine on its way to the salt deposit more nearly balances the column of brine ascending therefrom on its way to the evaporating apparatus than does the column of water, which is introduced into the salt deposit in the customary mode of mining salt by water. There is thus less strain on the pumping machinery; which diminution of strain would be especially important whenever the salt deposit should be at a great depth underground. Moreover, by the new procedure, more salt can be recovered in proportion to the fresh water and fuel used (the fresh water serving to dilute the residual brine and the fuel to heat the same preparatory to its introduction into the salt deposit) than by supplying fresh water to the salt deposit and heating the resultant brine in order to evaporate the same.

The operations of the new procedure can be carried on at any desired temperatures, so long as there is a suitable difference of temperature between the unsaturated brine supplied to the salt deposit on the one hand and the residual brine before it is diluted and heated for reuse on the other; but in dealing with gypsum containing deposits there are special advantages in carrying on the operations with reference to the varying solubility of calcium sulfate in water at different temperatures.

Water somewhere between 32° C. and 41° C. (which correspond, respectively, with 89 $\frac{6}{10}$ and 105 $\frac{8}{10}$ degrees of Fahrenheit's thermometer) has its maximum capacity to dissolve calcium sulfate, so that its capacity becomes less, whether the temperature of the water is raised above 41° C. or is lowered below 32° C. If residual brine remaining after the recovery of salt from the brine from a gypsum containing deposit and having a temperature of not less than 32° C. is heated to above 41° C. preparatory to its introduction into said deposit, or if residual brine of less than 32° C. is heated so far above 41° C. that the difference between its temperature and 32° C. would be less than the difference between 41° C. and the temperature of the brine supplied to the salt deposit, the effect of this adjustment of temperatures in either case is that the brine entering the salt deposit is more nearly saturated with calcium sulfate than it is with common salt; for the heating of the residual brine for reuse to above the temperature of maximum solubility of calcium sulfate increases the capacity of the water of said brine to hold salt in solution, while it reduces the capacity thereof to hold calcium sulfate in solution. Moreover, when the brine, after removal from the salt deposit at a temperature above that of the maximum solubility of calcium sulfate, is cooled in order to recover salt therefrom, the cooling increases the capacity of the water to hold the calcium sulfate in solution, while it diminishes the capacity of the water to hold salt in solution. Hence it is possible to precipitate pure salt from brine charged with calcium sulfate. The higher the temperature of the brine in the salt bed above that of the maximum solubility of calcium sulfate, the less the percentage by weight of calcium sulfate necessary to saturation; so that the aqueous liquid at such higher temperature, even if it were pure water, would dissolve less calcium sulfate than it would if not so highly heated.

Apart from any consideration of calcium sulfate, it is advantageous to have the brine in the salt deposit at as high a temperature as can economically be secured; for the higher such temperature may be above atmospheric temperature, the more readily can the brine on removal be lowered a given number of degrees.

The cooling and the partial evaporation of the brine from the salt deposit can be performed separately from each other, if preferred; and, whether performed separately or together, they may be effected in any suitable way; but a special improvement consists in effecting the partial evaporation (or at least a substantial part thereof) at the expense of heat in the brine when it leaves the salt deposit, and thereby effecting a lowering of the brine's temperature (as well as a partial evaporation) in one and the same operation. The use of heat conducting walls can thereby be dispensed with; although all use of such walls is not necessarily excluded.

In order to avail oneself of a larger proportion of the heat in the brine when it leaves the salt deposit than would take place by simple evaporation in the air, the aqueous vapor can be removed by exhaustion from the evaporating brine.

The heating and dilution of the residual brine can be performed separately from each other; and, whether performed separately or together, they may be effected in any suitable way; but a special improvement consists in effecting the heating (or at least a substantial part thereof) by condensation of steam in contact with the residual brine and thereby effecting also a dilution of the brine in the one operation. The condensation may take place at atmospheric or at other than atmospheric pressure; and the ratio of heating to dilution can be varied by changes in pressure. Addition of water may also be resorted to if more dilution should be desired.

As thus far described it is essential to the invention that unsaturated brine should be introduced into a natural salt deposit, should dissolve salt in said deposit, should be removed therefrom, should be cooled and partially evaporated (separately or together) for recovery of salt, and should be heated and diluted (separately or together) for reuse, the round of operations being continued as desired. It is possible, however, without encroaching on the prior state of the art, to omit one or more of these features; and it is intended to include all new, original and useful features of the invention as broadly as the prior state of the art will permit. Omissions, additions and other modifications may be made indefinitely so long as the substance is taken of any one or more of the claims at the end of this specification.

The main and perhaps exclusive use of the present invention will, it is believed, be found in the recovery of common salt; and the several improvements are, therefore, described and claimed herein in terms as applied to such recovery, it being left to the reader to make necessary changes to adapt the description and claims to other appropriate water soluble substances to which it may be desired to apply the invention, or any part thereof. If the substance to be recovered should be contaminated with impurities whose solubility should vary with rise of temperature inversely as does the substance to be recovered, what is herein described with reference to common salt and gypsum may be applied; and if, in any case, the substance to be recovered should be less soluble at higher than at lower temperatures, the heating and cooling may be reversed, that is to say, according to one mode, the substance can be recovered by heating and partially evaporating the solution obtained from the deposit of such substance, the residual mother liquor being prepared for reuse by cooling and dilution.

In the accompanying drawing: Figure 1 is a view partly in elevation and partly in section of a salt mining plant suitable for carrying the invention into effect; Fig. 2 is a sectional elevation of an evaporator which may be substituted for the vacuum pan of Fig. 1; and Fig. 3 is an end view of still another form of evaporator, the middle portion being broken away.

The salt well shown is of ordinary construction, the casing A is driven to the top of the solid limestone rock B, through which the uncased bore extends to the natural salt deposit C; and there is a pump D forcing the aqueous liquid down the casing A into the salt deposit C and removing the same charged with salt from said deposit up through the tubing E, which passes through a stuffing box 2 in the casing head A'. This also is a common arrangement.

In accordance with the main portion of the present invention unsaturated brine is used as the aqueous solvent liquid. This unsaturated brine is forced into the deposit C by the pump D; and after becoming charged with salt from said deposit C it is forced up the tubing E and is delivered by the pump F through the pipe 3 into the vacuum pan G or the evaporator G' (Fig. 2) or G'' (Fig. 3) or other suitable apparatus for cooling and partially evaporating the (ordinarily saturated) brine. In this apparatus the brine is forced to give up a portion of its salt, in consequence of the reduction in temperature and the loss of water; and the residual brine passing through the pipe 4 to the pump H is (by the latter) forced through the pipe 5 into the steam-condenser J or other apparatus for heating and diluting the said residual brine, from which the pump D takes the now no longer saturated brine, having its temperature restored, and forces it into the salt deposit C on a new round.

The temperature which the unsaturated brine has on entering the salt deposit C will depend upon how much heat shall be allowed to accumulate therein. For example assuming that the heat and moisture abstracted in the vacuum pan G, or one of the other evaporators (G' and G'' respectively) or other cooling and evaporating apparatus, shall equal the heat and moisture added to the residual brine in the vessel J, or other heating and diluting apparatus, and that there are no other losses, it is evident that whatever temperature shall be given the unsaturated brine at the start will be maintained. Practically it is convenient to obtain all the evaporation of the charged brine which may be consistent with a full delivery of saturated brine by the pump F, and to adjust the temperature by regulating the volume and temperature of the steam admitted into the vessel J, the pressure in said vessel J being allowed to accumulate if the temperature is to be carried above the boiling point at atmospheric pressure of the unsaturated brine. If other form of heater be used, the temperature can be appropriately regulated. It is also desirable to have the solvent liquid in the deposit C above atmospheric temperature, and if the said deposit contains gypsum (as is generally the case) to have it above the temperature of maximum solubility in water of calcium sulfate, which as already explained is somewhere between 32° C. and 41° C.; temperatures much higher than the highest of these limits are recommended for the unsaturated brine.

Evaporators in which evaporation is carried on without loss of temperature are well known; but such evaporators in their best forms have heat conducting walls for transmitting to the brine the heat which becomes latent in the water vapor produced by the evaporation. As hereinbefore explained, there are disadvantages in the use of such surfaces; especially when the evaporating brine contains calcium sulfate; and consequently use is made more advantageously of evaporators in which the evaporation takes place at the expense of heat in the brine, whose temperature is thereby lowered through the absorption of heat energy (in the form of latent heat) by the water vapor produced.

In Fig. 1 the cooler and evaporator G has a long outlet pipe 6 whose lower end is sealed by immersion in the residual brine in the salt collector G*, the length of said pipe being proportionate to the vacuum to be maintained in said vessel G. A sprinkler or rose 7 is shown on the end of the pipe 3 for delivering the brine into the vessel G. At its upper end a connection leads to the vapor condenser K, into which cold water from the pipe 8 is showered through the rose 9. This shower condenses most of the water vapor from the vessel G; and any uncondensed vapor is taken off by the pipe 10, which leads to a vacuum pump. The vapor as it forms in the vessel G is thus continually exhausted, and the rapidity of evaporation from the brine in said vessel is correspondingly increased.

The vapor condenser is provided with a long outlet pipe 11 to support a column of water corresponding with the vacuum. The salt is taken out of the collector G* in any suitable way, a bucket conveyer L being shown for the purpose and a salt wagon M being also shown in position to receive the salt as it is delivered by the conveyer L.

In Fig. 2 the vessel G' is open to the air and should be of such dimensions to expose a large area of brine. The rose 7 is turned up, so as to expose the brine in jets to the atmosphere. A screw conveyer L' is shown for taking off the salt which precipitates in consequence of the cooling and evaporation which take place in said vessel G'.

In Fig. 3 there are shown long shallow pans G'', open to the air and placed on a frame N. They are connected in series so that the brine from the salt bed C enters one of the top pans (the left hand pan as shown) flows its full length, returns through another pan of the top row, until it reaches the last of this row (the right hand top pan as shown) then it flows through the pipe 12 into the first pan of the next row, and passes successively through the pans of this row: the pipe 13 delivers it into the first pan of the bottom row; and after it has passed in succession through the pans of this row, it escapes as residual brine by the pipe 4, which conducts it to the pump H to be delivered (cooled and partly evaporated as compared with its state after removal from the salt bed C) into the vessel J, or other heating and diluting apparatus.

In the avaporators of Figs. 2 and 3, the evaporation takes place at the expense of heat stored in the brine, but the benefits of an exhaustion of the vapors (as in the evaporation of Fig. 1) is not obtained. They should be placed in a well ventilated building, so that the air above the brine shall not become saturated.

Heaters in which the elevation of temperature is effected without gain (or even with a loss) of volume of liquid heated are well known; and the apparatus for heating and diluting the residual brine may consist of one or more such heaters, in connection with means of any suitable description for introducing the diluting liquid into the residual brine before or after, or partly before and partly after, it enters the said heater or heaters, or while it is therein; but in such heaters use is made of conducting walls to transmit the heat to the brine; and as explained in the early part of this specification there are objections to or disadvantages in the use of such walls. Heaters in which water is raised in temperature by condensation of steam therein are also known; and any such heater may be used with or without additional means of diluting or heating or both.

Exhaust or live steam or both may be used; but exhaust steam has the advantage of economy; and in the case of brine-heating there is the special advantage that the avidity of the brine for moisture can condense steam after it has reached the temperature of the exhaust steam, with the result of raising the brine more nearly to its own boiling point above the temperature of the steam. So far as I am aware this principle was never before utilized in mining salt or in fact in any recovery of salt.

As shown the vessel J is provided with rings 14 and central disks 15 for bringing the steam and the brine more intimately in contact with each other; and with the same object there is a sprinkler or rose 16 on the end of the pipe 5 which delivers the residual brine into the vessel J. The pipe 17 delivers the steam into the bottom of the vessel J. This may be exhaust steam from the engine P, which is exhausted through the pipe 21; or live steam from the pipe 20 (which supplies said engine P) may be admitted through the valve 19, which is closed when live steam is not desired. The vessel J could be connected directly with a steam generator irrespective of any engine. If however, the plant is run on exhaust steam, it may sometimes be desirable to admit live steam along with the exhaust steam; or to run temporarily on live steam in case the sources of exhaust steam should be cut off. At 18 a safety valve is shown for preventing the accumulation of back pressure on the engine P, should brine accumulate in the vessel J. At 22 is a pipe for carrying off any surplus steam.

With the vessel J open to the atmosphere (through the pipe 22 for example) it is not possible to obtain unsaturated brine of a higher temperature than the boiling point of the brine under the atmospheric pressure; by closing the vessel J, however, and using steam of appropriate tension, higher temperatures may be utilized. In such case the pressure in the vessel J might be utilized in place of the force of the pump D, this latter being dispensed with. More work would be placed on the pump H, as it would have to force the residual brine against the pressure in the vessel J.

Even if the vessel J be open to the atmosphere, the pump D, or its equivalent, could be dispensed with if the difference in weight per square inch of cross section of the columns which respectively descend in the casing A and bore in rock B and ascend in the tubing E were less than the atmospheric pressure.

Where there is sufficient pressure in the casing head A', the pump F can be dispensed with. The residual brine could be delivered into the vessel J (or other heater) by gravity, if the evaporator were at a sufficient elevation; or if an elevated tank were used.

In working under superatmospheric pressure, the temperature of the brine may be such that it has to be held under superatmospheric pressure, in order to prevent it from generating steam in the tubing E and pipe 3 and thereby precipitating salt in them: in such case provision is made in any known or suitable way for holding the hot brine under pressure until it is discharged into the evaporator. On its escape, partial evaporation and cooling would take place immediately, and might be continued in the same or in other apparatus, with or without an exhaustion of the vapor.

In working under atmospheric pressure in the heater J with exhaust steam, the residual brine and the water of condensation can be raised to between 212° F. and 220° F.; and the temperature of the residual brine in the evaporators G G' or G'' can be reduced to about 80° F.; and the working with exhaust steam at substantially these temperatures is recommended.

In my application No. 736,842, filed November 13, 1899, I have described and claimed improvements, which (as so described) embody features that are also described herein or that may to some extent be suggested by what is herein described. These features, however, concern only the separation of common salt or like substance from solution; while the claims herein are all of them limited to processes which include as essential coöperating parts both the formation of a solution as specified in the respective claims and the separation of the common salt or like substance from the so formed solution. The improvements claimed in my said application No. 736,842 can be used and are designed (when so desired) to be used otherwise than in carrying out the processes claimed herein; which latter constitute, in fact, a distinct subject of invention.

I claim as my invention or discovery:—

1. The improvement in mining salt, consisting in introducing unsaturated brine into a natural deposit of salt, removing it charged with salt from said deposit, recovering salt by cooling and partially evaporating the charged brine, preparing the residual brine for reuse by heating and dilution, and so continuing, substantially as described.

2. The improvement in mining salt, consisting in introducing into a natural gypsum containing deposit of salt unsaturated brine heated above the temperature of maximum solubility of calcium sulfate, removing it charged with salt from said deposit, recovering salt by cooling and partially evaporating the charged brine in such manner as to leave a residual brine whose temperature is nearer to that of said maximum solubility than is the temperature of the brine supplied to the deposit, preparing the residual brine for reuse by diluting and heating, and so continuing, substantially as described.

3. The improvement in mining salt, consisting in introducing into a natural deposit of salt unsaturated brine heated above the atmospheric temperature, removing it charged with salt from said deposit, recovering salt by cooling and partially evaporating the charged brine, preparing the residual brine for reuse by heating and dilution, and so continuing, substantially as described.

4. The improvement in mining salt, consisting in introducing unsaturated brine into a natural deposit of salt, removing it charged with salt from said deposit, recovering salt by evaporation at the expense of heat in said brine when it leaves the deposit, so as to effect thereby a lowering of temperature as well as a partial evaporation, preparing the residual brine for reuse by heating and dilution, and so continuing, substantially as described.

5. The improvement in mining salt, consisting in introducing into a natural gypsum containing deposit of salt unsaturated brine heated above the temperature of maximum solubility of calcium sulfate, removing it charged with salt from said deposit, recovering salt by evaporation at the expense of heat in said brine when it leaves the deposit, so as to effect thereby a lowering of temperature as well as a partial evaporation and the lowering of temperature being such as to leave a residual brine whose temperature is nearer to that of said maximum solubility than is the temperature of the brine supplied to said deposit, preparing the residual brine for reuse by heating and dilution, and so continuing, substantially as described.

6. The improvement in mining salt, consisting in introducing into a natural deposit of salt unsaturated brine heated above the atmospheric temperature, removing it charged with salt from said deposit while it is still above atmospheric temperature, recovering salt by evaporation at the expense of heat in the brine when it leaves said deposit, so as thereby to effect a lowering of temperature as well as a partial evaporation, preparing the residual brine for reuse by heating and dilution, and so continuing, substantially as described.

7. The improvement in mining salt, consisting in introducing unsaturated brine into a natural deposit of salt, removing it charged with salt from said deposit, recovering salt by evaporation with the aid of an exhaustion of the vapors given off and at the expense of heat in said brine when it leaves the deposit, so as to effect thereby a lowering of temperature as well as a partial evaporation, preparing the residual brine for reuse by heating and dilution, and so continuing, substantially as described.

8. The improvement in mining salt, consisting in introducing unsaturated brine into a natural deposit of salt, removing it charged with salt from said deposit, recovering salt by cooling and partially evaporating the charged brine, condensing steam in contact with the residual brine to heat and dilute the same for reuse, and so continuing, substantially as described.

9. The improvement in mining salt, consisting in introducing into a natural gypsum containing deposit of salt unsaturated brine heated above the temperature of maximum solubility of calcium sulfate, removing it charged with salt from said deposit, recovering salt by cooling and partially evaporating the charged brine in such manner as to leave a residual brine whose temperature is nearer to that of said maximum solubility than is the temperature of the brine supplied to said deposit, condensing steam in contact with the residual brine to heat and dilute the same for reuse, and so continuing, substantially as described.

10. The improvement in mining salt, consisting in introducing into a natural deposit of salt unsaturated brine heated above the atmospheric temperature, removing it charged with salt from said deposit while it is still above atmospheric temperature, recovering salt by cooling and partially evaporating the charged brine, condensing steam in contact with the residual brine for reuse, and so continuing, substantially as described.

11. The improvement in mining salt, consisting in introducing unsaturated brine into a natural deposit of salt, removing it charged with salt from said deposit, recovering salt by evaporation at the expense of heat in said brine when it leaves the deposit, so as thereby to effect a lowering of temperature as well as a partial evaporation, condensing steam in contact with the residual brine to heat and dilute the same for reuse, and so continuing, substantially as described.

12. The improvement in mining salt, consisting in introducing unsaturated brine into a natural deposit of salt, removing it charged with salt from said deposit, recovering salt by evaporation with the aid of an exhaustion of the vapors given off and at the expense of heat in said brine when it leaves the deposit, so as thereby to effect a lowering of temperature as well as a partial evaporation, condensing steam in contact with the residual brine to heat and dilute the same for reuse, and so continuing, substantially as described.

13. The improvement in mining salt, consisting in introducing into a natural deposit of salt unsaturated brine heated above the natural temperature of the deposit, removing it charged with salt from said deposit while still above the latter's natural temperature, recovering salt therefrom by cooling, preparing the residual brine for reuse by heating, and so continuing, substantially as described.

14. The improvement in mining salt, consisting in introducing into a natural deposit of salt unsaturated brine heated above the natural temperature of the deposit, removing it charged with salt from said deposit while still above the latter's natural temperature, recovering salt therefrom by partial evaporation, preparing the residual brine for reuse by dilution, and so continuing, substantially as described.

15. The improvement in mining salt, consisting in introducing an aqueous solvent into a natural deposit of salt, removing it charged with salt from said deposit, recovering salt therefrom by evaporation at the expense of heat stored in the evaporating brine, condensing steam in contact with the residual brine, and utilizing the so heated brine as a carrier of stored heat for the promotion of evaporation as aforesaid, substantially as described.

16. The improvement in mining salt, consisting in introducing an aqueous solvent heated above atmospheric temperature into a natural deposit of salt, removing it charged with salt from said deposit while still at superatmospheric temperature, and recovering salt therefrom by cooling and evaporation, substantially as described.

17. The improvement in mining salt, consisting in introducing into a natural gypsum containing deposit of salt, an aqueous solvent heated above the temperature of its maximum capacity to dissolve calcium sulfate, removing it charged with salt from said deposit, and recovering salt therefrom, substantially as described.

18. The improvement in mining salt, consisting in introducing into a natural gypsum containing deposit of salt an artificial solution of calcium sulfate, removing it charged with salt from said deposit, and recovering salt by evaporation, substantially as described.

19. The improvement in mining salt, consisting in introducing unsaturated brine into a natural deposit of salt, removing it charged with salt from said deposit, and recovering salt therefrom by evaporation, substantially as described.

20. The improvement in mining salt, consisting in condensing steam in contact with an aqueous liquid and so heating it above atmospheric temperature, introducing the so heated liquid into a natural deposit of salt, removing it charged with salt from said deposit while it is still above atmospheric temperature, and recovering salt therefrom by evaporation, substantially as described.

21. The improvement in mining salt, consisting in introducing an artificially heated aqueous solvent into a natural deposit of salt, removing it charged with salt from said deposit while retaining heat imparted artificially as aforesaid, and recovering salt by evaporation, substantially as described.

22. The improvement in mining salt, consisting in introducing an artificially heated aqueous solvent into a natural deposit of salt, removing it charged with salt from said deposit while retaining heat imparted artificially as aforesaid, and recovering salt by evaporation at the expense of heat in the so charged solvent when it leaves the deposit, substantially as described.

23. The improvement in mining salt, consisting in introducing into a natural deposit of salt an aqueous solvent heated above atmospheric temperature, removing it charged with salt from said deposit while it is still above atmospheric temperature, and recovering salt by evaporation at the expense of heat in the so charged solvent when it leaves the deposit, substantially as described.

24. The improvement in mining salt, consisting in introducing unsaturated brine into a natural deposit of salt, removing it charged with salt from said deposit, and recovering salt by an evaporation at the expense of heat in the so charged brine when it leaves the deposit, substantially as described.

25. The improvement in mining salt, consisting in introducing into a natural deposit of salt unsaturated brine heated above the atmospheric temperature, removing it charged with salt from said deposit while it is still above atmospheric temperature, recovering salt by evaporation at the expense of heat in said brine when it leaves the deposit, so as thereby to effect a lowering of temperature as well as a partial evaporation, condensing steam in contact with the residual brine to heat and dilute the same for reuse, and so continuing, substantially as described.

26. The improvement in recovering salt, consisting in introducing unsaturated brine into a mass of salt, removing it charged with salt from said mass, recovering a part of the salt therefrom, preparing the residual brine for reuse by condensation of steam in contact therewith, and so continuing, substantially as described.

27. The improvement in recovering salt, consisting in condensing steam in contact with an aqueous solvent, introducing the so heated solvent into a mass of salt, removing it charged with salt, and recovering salt therefrom by evaporation at the expense of heat in the so charged solvent when it leaves said mass of salt, substantially as described.

28. The improvement in mining salt, consisting in introducing into a natural deposit of salt the hot water from condensing steam, removing the resultant brine, and effecting the evaporation of the latter by the aid of heat derived from such condensing steam, substantially as described.

29. The improvement in mining salt, consisting in introducing into a natural gypsum containing deposit of salt unsaturated brine heated above the temperature of maximum solubility of calcium sulfate, removing it charged with salt from said deposit, recovering salt by cooling and partially evaporating the charged brine, preparing the residual brine for reuse by diluting and heating it, and so continuing, substantially as described.

30. The improvement in mining salt, consisting in imparting both the latent heat of steam and the sensible heat of its water of condensation to brine from which salt is subsequently recovered by evaporation, the water of condensation being sent into a natural deposit of salt and so charged with salt to form brine for such evaporation, substantially as described.

31. The improvement in mining salt, consisting in condensing steam by imparting its latent heat to brine, mingling its water of condensation with the so heated brine, introducing the resulting unsaturated brine into a natural deposit of salt, removing it charged with salt, and recovering salt therefrom, substantially as described.

32. The improvement in mining salt, consisting in condensing steam in contact with brine in such relative proportions as to furnish heat sufficient to raise the temperature of the brine above that of said steam, introducing the so heated unsaturated brine into a natural deposit of salt, removing it charged with salt, and recovering salt therefrom, substantially as described.

In testimony whereof I affix my signature in presence of two witnesses.

HERMAN FRASCH.

Witnesses:
T. W. LOTHMAN
T. E. DECKAND